United States Patent [19]
Marin

[11] 3,739,883
[45] June 19, 1973

[54] DISC BRAKE WITH RESILIENT TORQUE CONNECTION
[75] Inventor: Glenn R. Marin, Ransomville, N.Y.
[73] Assignee: The Carborundum Company, Niagara Falls, N.Y.
[22] Filed: Apr. 1, 1971
[21] Appl. No.: 130,136

[52] U.S. Cl............ 188/71.1, 64/27 S, 188/73.2, 188/251 A, 192/70.17, 192/106.1
[51] Int. Cl............................................ F16d 55/00
[58] Field of Search ............... 188/71.1, 71.5, 73.2, 188/73.5, 251; 192/70.16, 70.17, 70.2, 106.1, 106.2, 55; 64/27 R, 27 L, 27 S, 15 C; 287/52.05, 53 LK

[56] References Cited
UNITED STATES PATENTS
1,154,891   9/1915   Sharpnack............................ 192/55
1,997,021   4/1934   Spase............................ 192/106.1 X
3,218,828   11/1965  Thelander..................... 192/106.1 X
3,552,533   1/1971   Nitz................................. 188/251 A X
3,605,967   9/1971   Warren et al.................. 188/73.2 X Primary Examiner—George E. A. Halvosa
Attorney—David E. Dougherty and Raymond W. Green

[57] ABSTRACT

A flexible transmission band for applying braking torque force to the driven friction members of a disc brake. The band functions in such a manner as to reduce shear and impact loading on the brake members, replacing this at least partially by compressive and friction loading on the outer periphery of the brake discs. Shear loading can be reduced further by providing discs with wider rims which permit correspondingly wider and stronger keyway slots.

6 Claims, 11 Drawing Figures

PATENTED JUN 19 1973 3,739,883

INVENTOR.
GLENN R. MARIN
BY David E. Dougherty
Raymond W. Green

INVENTOR.
GLENN R. MARIN

DISC BRAKE WITH RESILIENT TORQUE CONNECTION

BACKGROUND OF THE INVENTION

This invention relates to disc brakes. Like other mechanical brakes, these brakes arrest the rotational motion of mechanical parts by converting mechanical energy to heat. The heat is produced by rubbing together two friction surfaces. In disc brakes, at least one of the friction surfaces is the face of a disc which is rotated relative to another friction surface. Multiple disc brakes are constructed from a plurality of friction discs, some driven, that is, attached to the rotating part and others which are fixed or stationary. The disc surfaces are pressed against each other by axial forces to cause braking.

Disc brakes, like all brakes, must be capable of withstanding and absorbing or conducting away the heat created by braking. Otherwise, the brake parts would be heated to temperatures at which they would fail, for example, by warping, fracture or disintegration.

Disc brakes have a variety of uses, one of which is for stopping aircraft. As aircraft become larger and land at faster speeds, it becomes increasingly difficult to provide them with satisfactory brakes. These brakes must be designed to stop the aircraft during normal landings with minimal friction surface wear. The brakes must also be able to stop the aircraft following a rejected take-off under the worst possible combinations of weight and speed, during which the brakes may have to absorb three or four times the normal amount of kinetic energy.

In addition to the high energy dissipation requirements, aircraft brakes must be as lightweight as possible. As the weight of the brake is reduced, its capacity for heat absorption is also reduced and higher braking temperatures result unless the materials are changed to those having a greater heat capacity. High temperatures increase brake wear and decrease the friction coefficient between the rubbing surfaces.

If temperatures go high enough, metal brake discs will warp and the brake is ruined. Adequate friction disc materials are of the greatest importance in successful brake design. The methods of mounting the discs and the transmission of braking torque are also critical. Breakage or shearing of a disc support or driving member by applying a sudden braking torque may ruin the brake long before any significant frictional wear takes place.

Brake discs must be made from materials that have good heat capacity and thermal conductivity, satisfactory frictional properties, tensile and shear strengths over the range of operational temperature, good resistance to wear, and preferably of light weight. Most discs are now made from metal. Resin bonded pads are often used on smaller aircraft. A recent patent (R. D. Rutt, U.S. Pat. No. 3,473,637) describes the use of carbon and graphite as friction discs. These materials are excellent except for their low tensile and shear strengths. To overcome this problem the aforementioned patent suggests reinforcing the discs to achieve the necessary strength required for disc brake operation.

SUMMARY OF THE INVENTION

This invention provides a disc brake for arresting the rotary motion of a driving member, comprising at least one driven friction disc and at least one stationary friction disc, with means for axially compressing the discs together and means for transmitting and distributing braking torque on the peripheral surface of the driven discs, said transmitting and distributing means comprising a plurality of flexible metallic bands attached at one extremity to the driven discs and at the other extremity to the driving members. The invention also provides a brake disc comprising an inner periphery and an outer periphery in which one of the peripheries has keyways adapted to bear circumferential stress, this periphery having substantially greater axial width than the portion of the disc which is subjected to frictional contact with adjacent discs.

DETAILED DESCRIPTION

A disc brake, according to this invention, includes one or more driven friction discs and one or more stationary friction discs radially spaced about a shaft. Axial means are provided for compressing the friction discs together. Means such as two or more flexible metal bands encircling the peripheries of the driven discs transmit the brake torque to the discs. Since the bands encircle the peripheries of the discs, some of the brake torque is transferred to the discs by frictional loading on the outer peripheries, thereby reducing the shear loading in the disc keyways.

Figure 1:
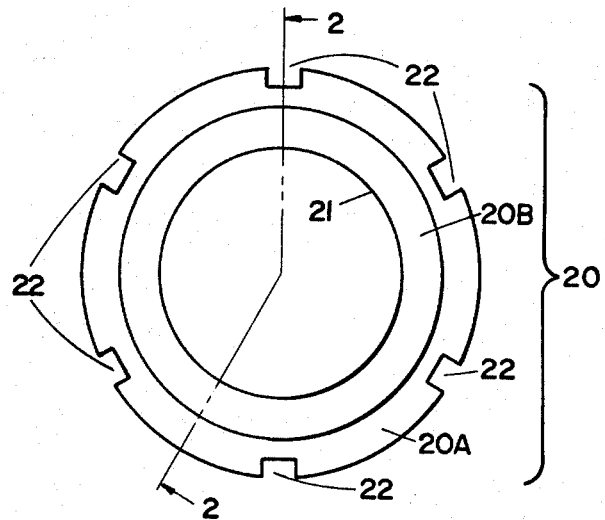
FIGS. 1 and 2 are front and sectional views, respectively, of a driven friction disc.
Figure 3:
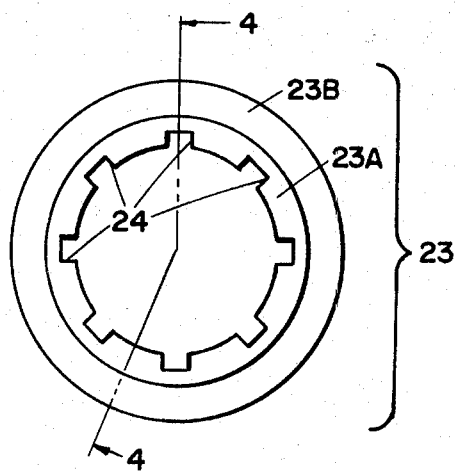
FIGS. 3 and 4 are front and sectional views, respectively, of a stationary disc.
Figure 2:
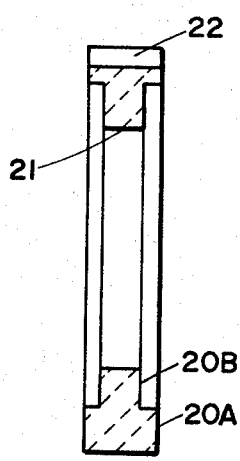
Figure 4:
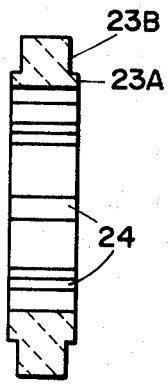

For a more detailed explanation of the invention, reference is first made to FIGS. 1 to 4 which illustrate the friction elements of a disc type brake. The driven friction element 20 is a carbon ring having a centrally located aperture 21 and having on its outer peripheral surface two or more indentations or keyways 22. The keyways 22 act in conjunction with torque transmission bands 28 (see FIGS. 8–11) to transfer motion from a wheel hub 26 (see FIG. 5) to the driven friction element 20. A peripheral portion 20A has a substantially greater width than the frictional wearing surface 20B. The greater width of peripheral portion 20A results in wider keyways having a correspondingly increased strength for shear loading. FIG. 2 illustrates the wider disc periphery which may increase keyway strength by as much as 50 percent. The stationary friction element 23, shown in FIG. 3, is also a carbon ring which contains two or more indentations or keyways 24 on its inner peripheral surface. This inner peripheral surface 23A of element 23 also has a width substantially greater than the frictional wearing surface 23B. The increased width of the inner peripheral surface results in wider keyways having a correspondingly increased strength for shear loading. In the brake assembly as described, the keyways 24 slideably engage corresponding spline members on the brakeshaft 25 (see FIG. 5) thereby permitting axial movement along the fixed brakeshaft. Other modifications of brake design may reverse this action, allowing rotation of the brakeshaft and of the sliding discs thereon while the alternate engaging discs are held stationary.

The width of the wearing portions of the friction elements as compared to the width of their keyway peripheries may vary in the respective ratios of 1:1.05 to 1:1.9, depending on the strength of the friction material used. Although the torque transmission bands of the invention have been described in conjunction with brake disc elements having keyway peripheries of greater width than the width of the disc wearing portion, they are not restricted to this application. The transmission bands may also be used in brake designs employing friction elements in which each disc has a uniform width throughout its structure; or in designs in which one or more discs have wide keyway peripheries as described, while the opposing discs are of uniform width.

Figure 5:
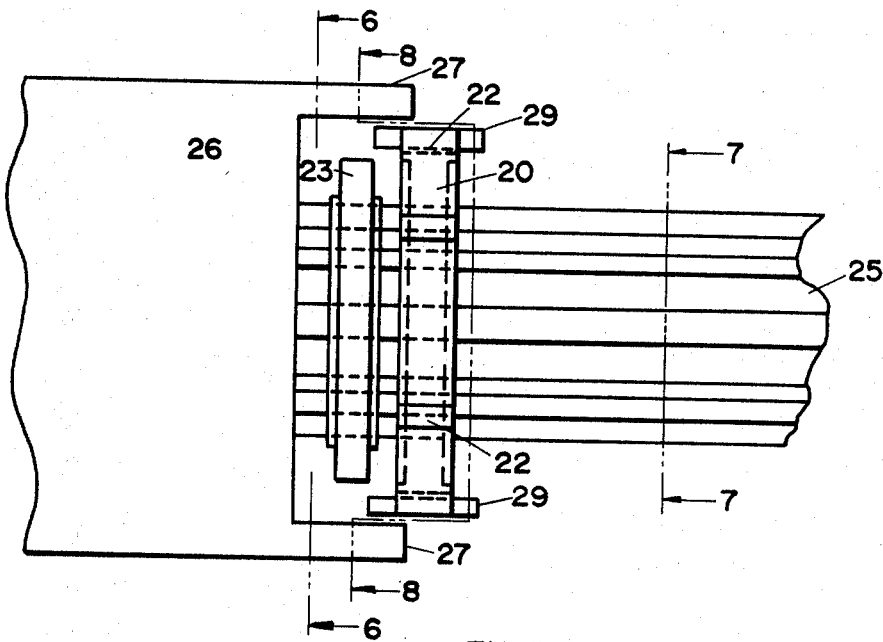
FIG. 5 is a side view showing the relative positions of the friction discs upon the brakeshaft and their relationship to the wheel hub.

A side view of a partial brake assembly is shown in FIG. 5. The stationary and driven friction elements 20 and 23 are shown in relationship to one another, to the fixed brakeshaft 25 and the moving wheel hub 26. Only two friction elements are shown, however, several pairs of corresponding elements may be included in a brake. Pressure plates and pressure applying means are not shown, these details have been adequately described, as in R. D. Rutt, U.S. Pat. No. 3,473,637. The wheel hub 26 has two or more disc driving members 27, axially aligned adjacent to the peripheral surface of the driven discs, each of which engages a torque transmission band 28 (not shown in FIG. 5).

Figure 7:
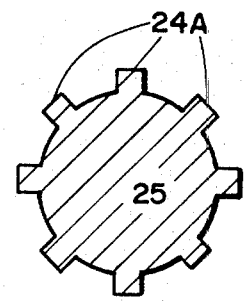
FIGS. 6 and 7 are sectional views, respectively, of the wheel hub and the brakeshaft.
Figure 6:
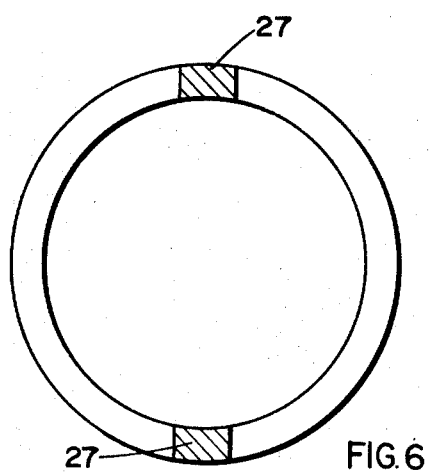

Sectional views of wheel hub 26 and brakeshaft 25 are shown in FIGS. 6 and 7, respectively.

Figure 8:
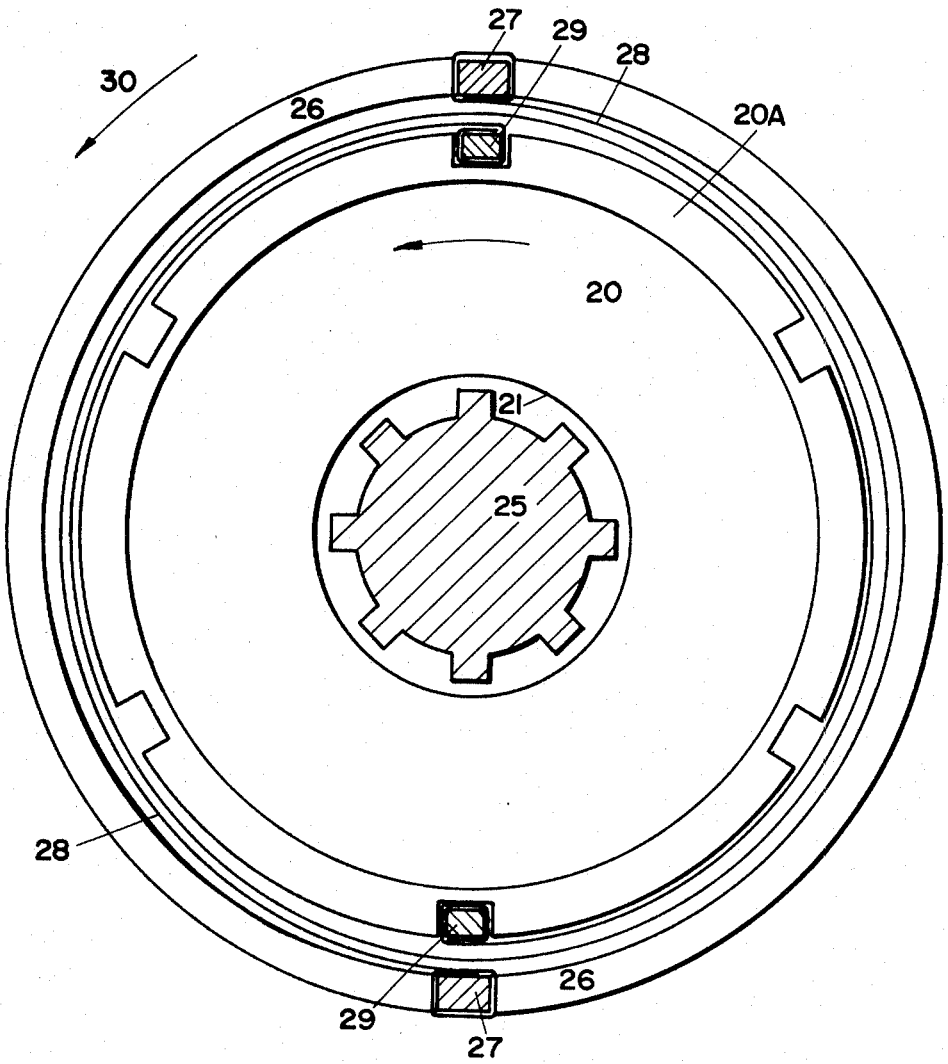
FIG. 8 is an end view, partially in section, of the brake assembly shown in FIG. 5 illustrating a method of applying braking force to a driven friction disc by means of torque transmission bands.

FIG. 8 shows an end view partially in section, of the brake assembly, taken along line 8—8 of FIG. 5, illustrating the preferred method of attachment for the torque transmission bands 28. Flexible metal strips 28 are attached at one end to the disc driving members 27. The bands 28 pass around the outer peripheral protion 20A of the driven friction disc 20 and are attached to the keyway bar members 29. As the wheel hub 26 rotates in a counter clockwise direction, (shown by arrow 30) its torque is transferred by the disc driving members 27 through the torque transmission bands 28 and keyway bar members 29 to the driven friction disc 20, causing disc 20 to rotate with the wheel hub 26. Braking pressure as applied to the friction discs 20 and 23 results in a tensioning of the torque transmission bands around the outer periphery of the disc during transmittal of the braking force to the rotating wheel hub 26.

The slight flexibility in the transmission bands 28 reduces the shock effect of sudden braking and substitutes a frictional force loading. This loading is evenly distributed over the periphery of the rotating brake disc 20, rather than exerting a shear loading such as that found in a conventional keyway driven disc. For purposes of clarity, only two transmission bands, with their attachments, have been shown in FIG. 8; however, it should be understood, that more than two bands may be used in connection with corresponding driving attachments.

Figure 9:
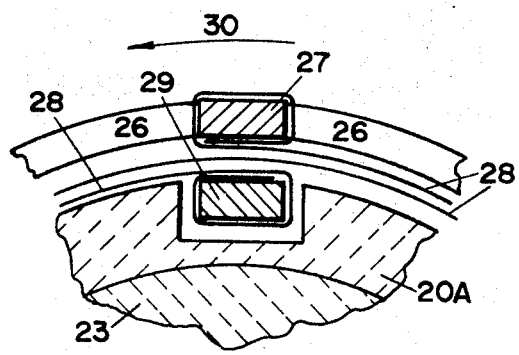
FIG. 9 is an enlarged view showing a method of band attachment to the hub driving element and the driven friction disc.

FIG. 9 is a detailed view of the disc driving member 27 and the keyway bar member 29, showing one method of attachment for the torque transmission band 28. Direction of rotation is shown by arrow 30. The transmission band 28 may be fastened to the driving members 27 and 29 by well-known methods such as welding or riveting.

Figure 10:
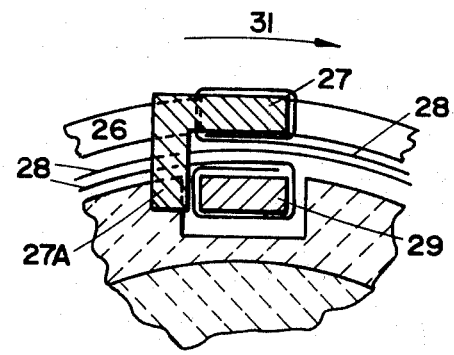
FIG. 10 shows a preferred embodiment of the connecting members.
Figure 11:
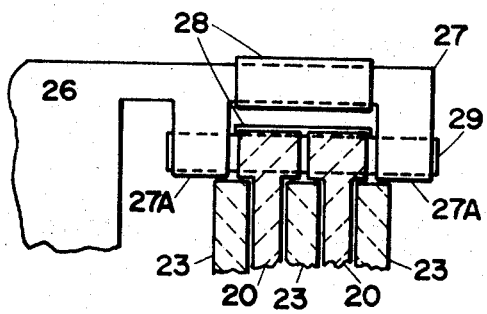
FIG. 11 is a side view of the preferred embodiment of FIG. 10.

In FIGS. 10 and 11, front and side views of a preferred embodiment of the disc driving member 27 are shown in which a projecting member 27A extends downward to engage the keyway bar member 29 upon a clockwise rotation of the wheel hub, thereby allowing brake action during reverse motion in the direction shown by arrow 31. Without this modification the transmission bands can be loosened if reverse motion takes place.

Metals suitable for use as torque transmission bands include carbon steel, stainless steel and tungsten steel. Other metals may be used so long as they have a satisfactory tensile strength at operating temperatures and conditions of use.

While the friction members of this invention may be made of suitable metals, the preferred friction material is reinforced carbon formed from a plurality of carbon fibers or fabrics bonded by a carbon binder. As used herein, the term "carbon" includes both ungraphitized and graphitized carbon. Reinforced carbon bodies have tensile strengths in the range of 5,000 to 9,000 psi. The carbon fibers or fabrics used in forming reinforced carbon bodies are derived from carbonization of fibrous materials such as cellulosic fibers or fabrics. The fiber may be used, for example, as woven or nonwoven cloth sheets, strips, yarn or individual fibers. Reinforced carbons are bonded by impregnating them with resins and pitches which can be carbonized by curing and baking. Reinforced carbons formed from a plurality of laminated woven carbon cloths or yarns are especially suitable for use in this invention, as well as carbon bodies built up by tape winding.

The forces applied to the friction elements during braking are severe, especially during emergency stops. The method for transmitting this force to the friction elements, without shearing or damage, is highly important and is achieved in this invention by the unique torque transmission bands. The slight amount of flexibility in the bands greatly reduces the shock of impact loads. Shear loading of the disc keyway slots is reduced and is partially replaced by frictional loading on the disc periphery. The greater the frictional load on the disc periphery, the less the shear load on the disc. Since high point loadings are substantially reduced, brake disc materials of lower tensile strength may be used in brake applications for which they were previously unsuitable; or alternatively, the same disc can be used at higher braking speeds.

What is claimed is:

1. A disc brake for arresting motion of a driving member, comprising:

a. at least one driven friction disc having an inner wearing section combined with a keyway containing peripheral rim section;

b. at least one stationary friction disc having an outer wearing section combined with a keyway containing an inner peripheral rim section;
c. means for axially compressing the discs together;
d. at least one axially aligned keyway slot, disposed in the peripheral surface of the driven friction disc, the slot having an elongated bar member positioned therein; and
e. said bar member engaging a flexible metallic band attached at one extremity to the bar member; attached at the other extremity to the driving member; and surrounding the driven discs, whereby braking torque is transmitted between the bar member and the driving member.

2. A disc brake according to claim 1 in which the driving member has at least one radially projecting extension for engaging the bar member during reverse motion of the brake.

3. A disc brake according to claim 1 in which said driven discs include a plurality of axially aligned keyway slots, disposed in the peripheral surface of said driven discs, elongated bar members positioned in said keyways and brake driving members having radially projecting extensions for engaging said keyway bar members to insure brake functionality during reverse motion.

4. A disc brake according to claim 1 in which the discs are of uniform width throughout their structure.

5. A disc brake according to claim 1 in which said driven discs consist of an inner wearing section combined with a keyway containing peripheral rim section of substantially greater width than that of the inner wearing section.

6. A disc brake according to claim 1 in which said stationary discs consist of an outer wearing section combined with a keyway containing inner peripheral rim section of substantially greater width than the outer wearing section.

* * * * *

UNITED STATES PATENT OFFICE
CERTIFICATE OF CORRECTION

Patent No. 3,739,883            Dated June 19, 1973

Inventor(s) Glenn R. Marin

It is certified that error appears in the above-identified patent and that said Letters Patent are hereby corrected as shown below:

Column 5, line 3 (claim 1, line 8) delete "an".

Signed and sealed this 19th day of March 1974.

(SEAL)
Attest:

EDWARD M. FLETCHER, JR.
Attesting Officer

C. MARSHALL DANN
Commissioner of Patents